United States Patent
Gao et al.

[11] Patent Number: 5,871,802
[45] Date of Patent: Feb. 16, 1999

[54] ANIMAL FEED PELLETING PROCESS AND ANIMAL FEED PELLETS PRODUCED THEREFROM

[75] Inventors: Qingshan Gao; Bruce Willard Moechnig; Joe David Crenshaw, all of Quincy, Ill.

[73] Assignee: Moorman Manufacturing Co., Quincy, Ill.

[21] Appl. No.: 991,468

[22] Filed: Dec. 16, 1997

[51] Int. Cl.$^6$ .................................. A23K 1/00; A23B 4/03
[52] U.S. Cl. .................. 426/635; 426/389; 426/454; 426/464; 426/465; 426/516; 426/517
[58] Field of Search ...................... 426/389, 454, 426/464, 465, 512, 516, 517, 519, 635, 2

[56] References Cited

U.S. PATENT DOCUMENTS

| | | | |
|---|---|---|---|
| 4,012,535 | 3/1977 | Fiala et al. | 426/658 |
| 4,349,578 | 9/1982 | Wright et al. | 426/630 |
| 4,560,561 | 12/1985 | Henderson et al. | 426/74 |
| 4,954,355 | 9/1990 | Haarasilta et al. | 426/61 |
| 4,971,820 | 11/1990 | Likuski et al. | 426/281 |
| 4,976,977 | 12/1990 | Johnson et al. | 426/96 |
| 4,988,520 | 1/1991 | Overton | 426/74 |
| 5,281,434 | 1/1994 | Winowiski et al. | 426/635 |
| 5,391,371 | 2/1995 | Jacobsen et al. | 424/99 |
| 5,622,710 | 4/1997 | Binder et al. | 424/438 |

OTHER PUBLICATIONS

Pelleting's history and development by Larry H. Pitsch, Feed Management, Oct., 1990, vol. 41, No. 10 pp. 51,–, 70–72 (total 5).

*Primary Examiner*—Nina Bhat
*Attorney, Agent, or Firm*—Lockwood, Alex, FitzGibbon & Cummings

[57] ABSTRACT

A method of producing animal feed pellets wherein solid and liquid ingredients of the feed are premixed except for a liquid binder ingredient which is mixed in last. The resulting mash is extruded in a ring die pellet extruder without steam conditioning and the extruded pellets are cooled and/or dried as may be required. The liquid binder will have viscous and cohesive properties and preferably will be a condensed liquid byproduct from the grain, food or feed processing industries.

18 Claims, 1 Drawing Sheet

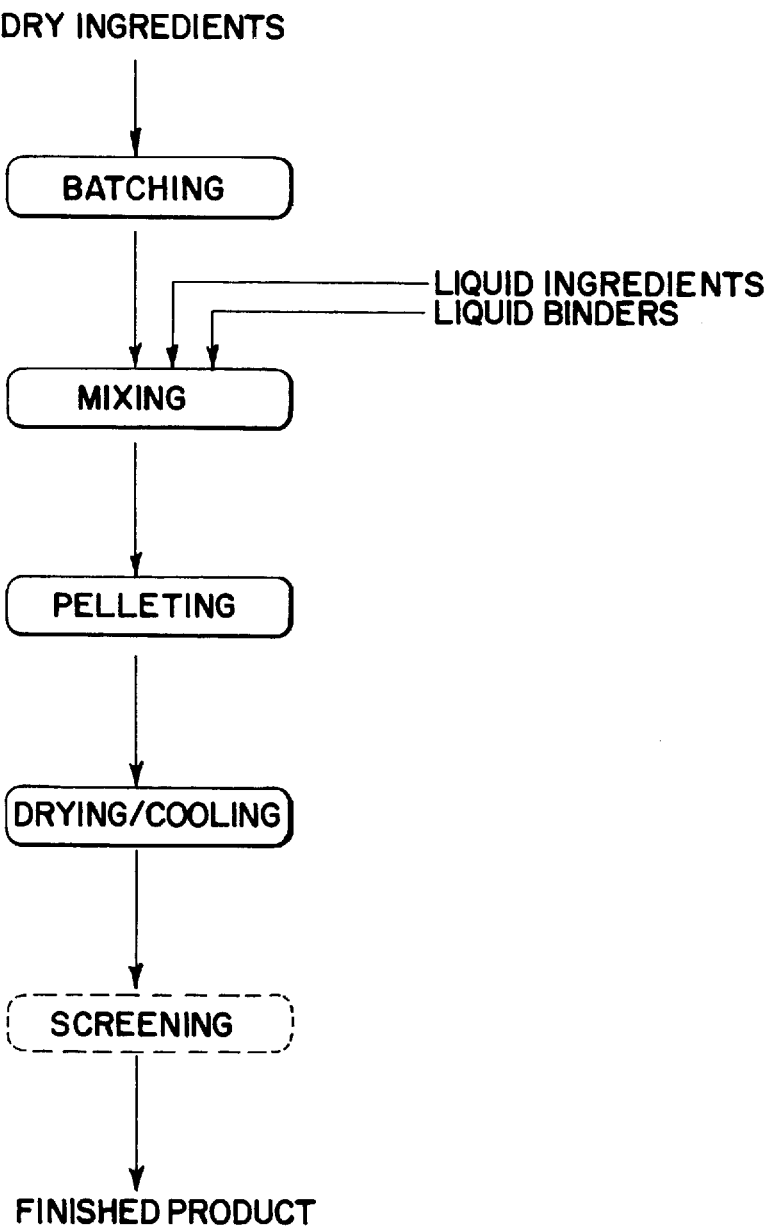

ANIMAL FEED PELLETING PROCESS AND ANIMAL FEED PELLETS PRODUCED THEREFROM

BACKGROUND OF THE INVENTION

Pelleting was introduced into the United States feed industry in the mid-1920's to improve feed utilization, increase the density of the feed and improve handling characteristics. Prior to about 1930 several different types of pelleting machines were utilized. Toward the end of the 1920's the so-called "flat die" pelleting machine and "ring die" pellet mill were developed in some of their prior forms. While the flat die machine is still in use in certain applications, the ring die pellet mill quickly became the preferred design and was quickly adopted by the animal feed industry and remains the form of pelleting machine of choice today. In addition to the ring die pellet mill itself, auxiliary equipment was developed including conditioners, cooler/dryers, and related process equipment.

The early pelleting process involved mixing the feed ingredients and pelleting them with no further treatment. The rationale for this approach was to prevent alterations to vitamins and proteins due to the addition of heat to the feed mix. In the late 1930's some processors began subjecting pellet-forming mixtures of animal feed to water and steam by passing the mixtures through a conditioner prior to introduction into the pellet extruders. The addition of steam improved production rates, reduced die wear, and improved pellet quality. Steam conditioning was quickly adopted by the industry and has remained an integral part of the pelleting process to the present time.

In the conditioning step, live steam is injected into the feed mash as it is conveyed through the conditioner which generally consists of a cylindrical tube with a rotating shaft upon which numerous paddles or picks are mounted. The condensing steam increases the temperature and moisture content of the mash. Since the steam is injected directly into the feed mash, the boiler treatment chemicals must be FDA approved.

The focus on research into the pelleting process since the 1960's has been on improving the conditioning operation, with emphasis on increasing the retention time and increasing the temperature to which the mash is conditioned. One of the more recent developments was a pressure pelleting system in which the conditioner and pelleting die cavities were pressurized. This allowed use of higher temperatures and longer conditioning times to improve pellet durability and increase the production rate. However, the use of increased temperatures and conditioning times militates against the inclusion of heat sensitive or labile ingredients which are desirable in complete animal feeds.

SUMMARY OF THE INVENTION

The present invention departs materially from the current pelleting processes by eliminating the conventional conditioning step involving the use of steam and elevated temperatures. In comparison with the conventional pelleting processes utilizing steam conditioning, the pelleting process of the present invention may be regarded as a "cold" pelleting process. In the cold pelleting process of the present invention, liquid binders are used in place of steam. The binders are animal feed ingredients in themselves and have viscous and cohesive properties. When the liquid binder is applied to the other feed ingredients, free moisture penetrates solid particles in the meal while the viscous cohesive substances in the binder agglomerate fine particles into larger particles and then remain on the surfaces of the large solid particles, creating a cohesive surface. When the resulting moist cohesive mash is compressed through the die, the particles are compacted and bound together to form pellets having enhanced durability with a substantial reduction in fines. In fact, a screening step to remove and recover "fines" is usually unnecessary.

The following are the more important objects and advantages of the present invention over the current conventional pelleting process in which steam and elevated temperatures are used: elimination of steam conditioning and elevated temperatures allows inclusion of heat sensitive and labile ingredients such as enzymes, microbials, and milk protein without loss or with reduced loss of potency; reduction in dust and fines due to improved pellet durability; higher inclusion levels of fat and liquid feed ingredients; and, reduction in energy requirements and elimination of steam requirements resulting in reduced costs of production.

For a more complete understanding of the nature and scope of the invention, reference may now be had to the following detailed description and examples taken in connection with the accompanying drawing.

BRIEF DESCRIPTION OF THE DRAWING

The drawing is a flow diagram of the cold pelleting process of the invention and according to which the following examples were conducted.

DETAILED DESCRIPTION

Referring to the flow diagram, the batching, mixing and pelleting steps can be carried out in the same type of known commercial equipment currently used in the conventional pelleting process. This equipment may be combined in an installation consisting of a mixer which discharges into a surge bin, which in turn discharges into a pellet mill consisting of a variable-speed feeder, a steam conditioning chamber, and a die/roller assembly. Feed mash flows from the feeder through the conditioner, which discharges into the die/roller assembly where the feed is extruded to form pellets. The pellets are then discharged from the pellet roll. In the present invention, the steam conditioning chamber is not essential to the process.

As in pelleting, the drying/cooling step may also be carried out in conventional commercial equipment such as a horizontal belt cooler in which the feed pellets are conveyed onto a moving belt through which air is drawn to cool and dry the product. The most recent development in the coolers is the counterflow cooler in which the air moves in the opposite direction of the pellets. The advantages of this style of cooler are the reduced floor space requirement and reduced air flow needed to achieve good cooling.

Depending on the fines content of the pellets after drying/cooling, the pellets may be screened to remove the fines that result as the pellets are cut at the die and that are generated in the subsequent handling during the drying/cooling process. For some feeds, the fines level may be as high as five to ten percent, or more. These fines are recycled back to the surge bin where they are fed back into the process along with the unpelleted mash.

After batching, the dry ingredients are mixed in the mixer. Then the liquid ingredients, such as fat and molasses, are added and mixed. Liquid binder is added last by blending the binder into the mix to obtain a uniform cohesive mash. Liquid binders can be used at a rate of 5 to 25% by weight in a formula, with 10 to 20% being preferred. Liquid feed ingredients are usually relatively economical nutrient sources being condensed liquid by-products from the grain, food or feed processing industries. The most commonly used liquid ingredients in the conventional pelleting process are molasses and fat. The amount of those liquids is usually restricted to less than 6% in a conventional pelleting process.

In the conventional pelleting processes, meal conditioning with steam is a prerequisite for the compression of the meal or mash into pellets. Heat and water from the steam serve to activate binders in the meal particles (i.e. protein and carbohydrates), soften them and bring cohesive properties onto the surfaces of the particles. When the mash is compressed through a die, the particles are compacted and stuck together to form pellets. In the cold pelleting process of the present invention, liquid binders are used instead of steam. The binders have viscous and cohesive properties. When such a liquid binder is applied, free moisture penetrates solid particles in the mash while the viscous, cohesive substances in the binder agglomerate fine particles into larger particles and then remain on the surfaces of large solid particles, creating cohesive surfaces. When the moist, cohesive mash is compressed through a die, the particles are compacted and bound together to form durable pellets. Liquid binders used in the cold pelleting process can be any condensed liquid byproducts from the grain, food or feed processing industries. The liquid binders should have a solids content of 20–80% by weight, preferably 35–65%, and should have viscous and cohesive properties. Typical liquid binders include Brewex (a concentrated molasses-like by-product of the brewing industry), corn steep liquor, condensed porcine solubles, condensed distillery solubles, molasses, desugared molasses, sugar syrup, and condensed liquid whey.

In the cold pelleting process the pellets discharge from the pellet extruder die at a temperature of 100 to 150 degrees F., usually below 135 degree F., depending upon the diet formula, type of liquid binders and levels of binder used. In contrast, in conventional pelleting processes the pellets may have temperatures of 160 to 200 degree F. The low temperatures of the pellets of the present invention provide an opportunity to incorporate heat sensitive and labile substances such as enzymes, microbials, and milk proteins which can be destroyed and/or rendered nutritionally unavailable by heat in conventional pelleting processes. It will be noted from the flow diagram that steam is not introduced in the process according to the present invention.

The following examples illustrate practical embodiments of the invention.

EXAMPLE 1

Nursery Pig Feed Pellets

Formula

|  | % By Weight |
| --- | --- |
| Nursery pig base mix of vitamins and trace minerals | 5.3 |
| Ground corn | 32.6 |
| Soybean meal | 30.0 |
| Whole whey | 11.8 |
| Animal Fat | 3.3 |
| Brewex | 17.0 |

Mixing

All of the ingredients in the above formula except Brewex were mixed sufficiently to get a uniform mix. The Brewex was then added into the mixer, and mixed 2 minutes. A moist, cohesive mash was obtained at end of the final mixing.

Pelleting

After mixing, the mash was delivered to the pellet mill feeder through a bypass of the surge bin above the pellet mill. The mash was fed into the pellet mill conditioning chamber and then to the roller and die extruder. Steam was not added and no mash conditioning was involved. When the mash was compacted through the die, soft, moist pellets were formed. The extruded pellets had a temperature below 120 degrees F. and a moisture content of 16–17%.

Drying

The wet pellets were dried in a cooler or a dryer to obtain a moisture content below 12%. The final product had a pellet durability index (PDI) of 98.1 when tested without nuts, and a PDI of 83.5 when tested with nuts. Both of these PDI values would be considered very good for this formula considering the level of added fat.

The durability of the finished pellets was determined according to the procedure set forth in Section 6, paragraph 2 of ASAE Standard S269.3 using the apparatus specified therein. The pellets were tumbled in the test apparatus both in the absence and in the presence of three ¾-inch and three ⅞-inch hex nuts. Hex nuts were added to make the test more aggressive and to more closely predict the amount of fines that could be expected to be generated in subsequent handling of the pellets. The PDI value equals the percentage by weight of the pellets surviving the test.

EXAMPLE 2

Beef Feed Pellets

Formula

|  | % By Weight |
| --- | --- |
| Beef base mix of vitamins and trace minerals | 10.4 |
| Corn gluten feed | 6.4 |
| Soybean meal | 25.5 |
| Cottonseed meal | 47.2 |
| Animal Fat | 0.5 |
| Corn steep liquor | 10.0 |

Mixing

All of the ingredients in the above formula except corn steep liquor were mixed in a mixer for a period of time to get a uniform mix. The corn steep liquor was then added into the mixer, and mixed 2 minutes. A moist, cohesive mash was obtained at end of the final mixing.

Pelleting

After mixing, the mash was delivered to the pellet mill feeder through a bypass of the surge bin above the pellet mill. The mash was fed into the pellet mill conditioning chamber and then to the roller and die extruder. Steam was not added and no mash conditioning was involved. When the mash was compacted through the die, soft, moist pellets were formed. The extruded pellets had a temperature below 140 degree F. and a moisture content of 13–14%.

Drying

The wet pellets were dried in a cooler or a dryer to obtain a moisture content below 12%. The final product had a pellet durability index of 98.4 when tested without nuts, and a PDI of 92.8 when tested with nuts. Both of these PDI values would be considered very good.

EXAMPLE 3

Dairy Feed Pellets

Formula

|  | % By Weight |
| --- | --- |
| Dairy base mix of vitamins and trace minerals | 24.3 |
| Ground corn | 34.7 |
| Wheat midds | 25.0 |
| Brewex | 16.0 |

Mixing

All of the ingredients in the above formula except Brewex were mixed in a mixer for a period of time to get a uniform mix. The Brewex was then added into the mixer, and mixed 2 minutes. A moist, cohesive mash was obtained at end of the final mixing.

Pelleting

After mixing, the mash was delivered to the pellet mill feeder through a bypass of the surge bin above the pellet mill. The mash was fed into the pellet mill conditioning chamber and then to the roller and die extruder. Steam was not added and no mash conditioning was involved. When the mash was compacted through the die, soft, moist pellets were formed. The extruded pellets had a temperature below 120 degrees F. and a moisture content of 16–17%.

Drying

The wet pellets were dried in a cooler or a dryer to obtain a moisture content below 12%. The final product had a pellet durability index of 98.0 when tested without nuts, and a PDI of 88.8 when tested with nuts.

For comparison, a test batch of the above product was prepared in which ground corn was substituted for the Brewex and the mixture pelleted using the conventional process. The mash was conditioned with steam to a temperature of 165 F. The resultant pellets were cooled to a moisture content below 12 percent and durability values measured. Without nuts in the tester, the PDI value was 90.0. When nuts were included, the PDI value was 40.0. These values are well below the corresponding PDI values of the pellets produced according to the present invention.

EXAMPLE 4

Swine Feed with Enzyme

A test was conducted to compare a conventional pelleting process to the process of this invention when a heat sensitive enzyme was included in the feed mix. Test batches of a swine grow/finish feed containing corn, soybean meal, midds, base mix and phytase enzyme were prepared. The test batches were pelleted using the conventional process with steam added to achieve conditioned meal temperatures of 97, 159 and 192 F.

A test batch was also prepared using the process of this invention containing 16 percent Brewex. The formula was adjusted to maintain the same nutrient profile in the feed for both processes. This batch was pelleted with no steam conditioning.

Samples of the meal and cool pellets from both the conventional and cold pelleting processes were submitted for phytase activity measurements. Results are presented in the table below.

| Sample Description | Meal Temperature (F.°) | Conditioning Temperature (F.°) | Hot Pellet Temperature (F.°) | Phytase Activity (FTU/g) |
| --- | --- | --- | --- | --- |
| Conventional |  |  |  |  |
| Meal w/enzyme |  |  |  | 1086 |
| Pellet | 80 | 159 | 170 | 429 |
| Pellet | 80 | 192 | 183 | <75 |
| Cold Pelleting |  |  |  |  |
| Meal |  |  |  | 789 |
| Pellet | 81 |  | 117 | 992 |

Conventional pelleting practice resulted in significant loss of the enzyme activity when the mash was conditioned to 159 F. and complete destruction of the enzyme at a conditioned meal temperature of 193 F. In contrast, the cold pelleting process yielded a pellet with no loss of enzyme activity.

EXAMPLE 5

Swine Feed with Increased Fat Levels

A test was conducted to compare the conventional pelleting process to the process of this invention when animal fat was added to the formula at a level of 7.5 percent. Test batches of a swine grow/finish feed containing corn, soybean meal, wheat midds and added fat were prepared. The test batches were pelleted using the conventional process with steam added to achieve a conditioned meal temperature of 169 F.

A test batch was also prepared using the process of this invention containing 16 percent Brewex. The formula was adjusted to maintain the same nutrient profile and added fat level in the feed for both processes. This batch was pelleted with no steam conditioning.

Samples of the cool pellets from both the conventional and cold pelleting processes were tested for pellet durability. The pellets produced using the conventional process had PDI values of 80.3 when tested without nuts in the tester, and 6.1 with nuts. Corresponding durability measures from the cool pellets produced using the cold pelleting process were 90.4 without nuts and 38.4 with nuts. The process of this invention allows the incorporation of high levels of added fat in diets without significant loss in durability of the resultant pellets compared to the conventional pelleting process.

What is claimed is:

1. A method of making ready-to-consume animal feed pellets without using steam conditioning, which comprises, forming a uniform mixture of solid and liquid animal feed ingredients including a binding concentration of from about 5 to about 25% by weight of said mixture of at least one liquid binder, passing said mixture through a pellet mill having a roller and die extruder without subjecting it to steam conditioning, and optionally drying and/or cooling the extruded pellets.

2. Animal feed pellets made according to the method of claim 1.

3. The method of claim 1 wherein said liquid binder is added after the other feed ingredients have been premixed.

4. Animal feed pellets made according to the method of claim 3.

5. The method of claim 3 wherein said liquid binder has viscous and cohesive properties.

6. Animal feed pellets made according to the method of claim 5.

7. The method of claim 1 wherein said feed ingredients include at least one heat sensitive or labile feed ingredient.

8. Animal feed pellets made according to the method of claim 7.

9. The method of claim 1 wherein said at least one liquid binder is a condensed liquid byproduct from the grain, food or feed processing industries.

10. Animal feed pellets made according to the method of claim 9.

11. The method of claim 1 wherein said at least one liquid binder is selected from the group consisting of Brewex, corn steep liquor, condensed porcine solubles, condensed distillery solubles, molasses, sugar syrup and condensed liquid whey.

12. Animal feed pellets made according to the method of claim 11.

13. The method of claim 1 wherein the temperature of said pellets as extruded does not exceed 150 degrees F.

14. Animal feed pellets made according to the method of claim 13.

15. The method of claim 1 wherein said liquid binder comprises from about 10 to about 20 per cent by weight of the animal feed.

16. Animal feed pellets made according to the method of claim 15.

17. The method of claim 1 wherein the pellet mill has a ring die pellet extruder.

18. Animal feed pellets made according to the method of claim 17.

* * * * *